May 26, 1931. L. D. ELLIS 1,806,749

TOY WAGON

Filed April 20, 1929

Inventor
Laurence D. Ellis
By *(signature)*
Attorney

Patented May 26, 1931

1,806,749

UNITED STATES PATENT OFFICE

LAURENCE D. ELLIS, OF TOLEDO, OHIO

TOY WAGON

Application filed April 20, 1929. Serial No. 356,747.

My invention has for its object to provide a toy wagon that is light in weight, relatively long in body, and having the general appearance of a coaster sled. It particularly has for its object to provide a wagon that may be used substantially in the same way that a sled is used, whereby coasting may be done in substantially the same way as sled coasting is done.

The wagon is relatively low lying and has a pair of side rails extending along the sides of the platform. It also has a steering arrangement that normally maintains the front directing wheels in line with the rear wheels, means being provided for yieldingly resisting deflection therefrom.

The invention may be contained in toy wagons that vary in their details and, to illustrate a practical application of the invention, I have selected a wagon that is illustrative of the various embodiments of my invention and shall describe it hereinafter. The particular wagon selected is shown in the accompanying drawings.

Figure 1:
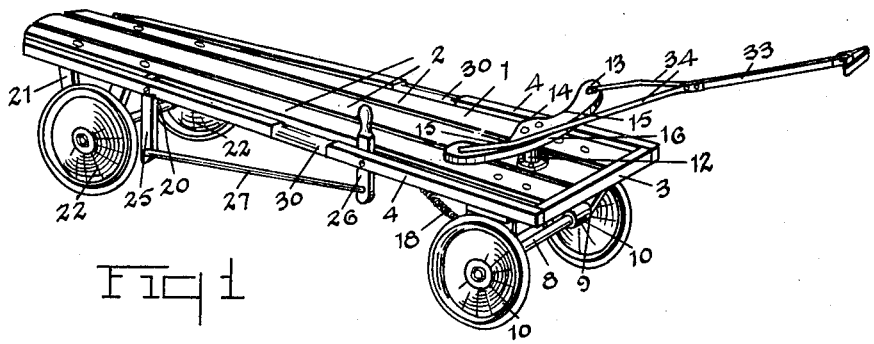
Figure 2:
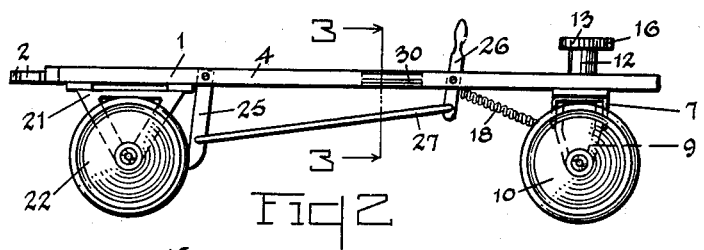
Figure 3:
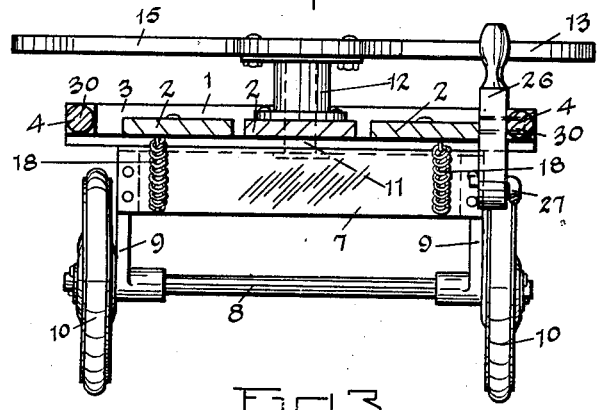
Figures 4, 5:
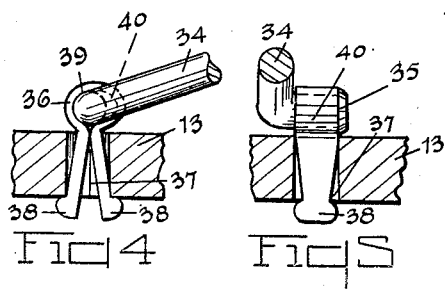

Fig. 1 is a perspective view of the wagon. Fig. 2 is a side view of the wagon. Fig. 3 is a view of a section taken on the plane of the line 3—3 indicated in Fig. 2. Fig. 4 is a view of a handle and a means of connecting it to the wagon. Fig. 5 is another view of the construction illustrated in Fig. 4.

In the particular wagon shown in the drawings, the wagon 1 has a flat top formed of a plurality of strips or narrow boards 2 that form a platform for the wagon. The strips 2 are relatively long and thin and hence are elastic. The forward end of the top has a cross piece 3, considerably thicker than the strips 2. It is connected to the ends of the strips 2. A pair of rails 4 are secured in spaced relation to the outer edge of the strips 2. The rails 4 have cross sectional dimensions substantially the same as the cross piece 3. The cross strip 3 and the rails 4 operate as a buffer and greatly strengthen and protect the wagon in case of accident.

The front truck comprises the supporting cross bar 7 to which the axle 8 is connected by means of a pair of brackets 9. The cross bar 7 is formed of channel iron, the brackets are formed V-shaped and the legs are secured to the flanges of the cross bar. The rubber tired wheels 10 are rotatably supported on the ends of the axle 8. The cross bar 7 is swiveled to the top by means of the pin 11 that extends through the center strip 2 and through a suitable bearing sleeve 12. A steering bar 13 is connected to the upper end of the pin 11. The steering bar 13 is, preferably, formed substantially crescent shape and has a central nose 14 to form the curved recessed parts 15 on the rear side of the steering bar 13 and the curved edge 16 on the front of the bar. This affords a convenient structure for retaining the feet, when the steering is performed by the feet, while being seated on the flat top of the wagon and when the wagon is moving by reason of its inertia or because it is being pushed by someone from behind, or when coasting down hill.

The position of the front truck is normally maintained at right angles to the major axis of the wagon by means of a pair of springs 18 that are connected to the ends of the channel bar 7 and to the two outer strips 2 of the wagon. When in this position the springs 18, which are tension springs, are loose, but when the truck is turned on the axis of the pin 11, one or the other of the springs 18 is subjected to a tension corresponding to the angle of the deflection, which operates to return the truck to its normal position when the deflecting force has been removed.

The rear axle 20 is supported by a pair of brackets 21 that are secured to the end of the top of the wagon. The rear tired wheels 22 are located on the ends of the axle 20.

A suitable brake may also be located so as to engage one of the rear wheels 22. As shown, a pivoted brake member 25 is secured between one of the rails 4 and the edge of one of the strips 2. It depends so that its lower end may be positioned to engage one of the tires of the wheels 22. A lever 26 is pivotally supported between one of the rails 4 and one of the strips 2, and a rod 27 is connected to the lower end of the lever 26 and to the brake member 25, which may be operated by movement of the lever 26.

The rails 4 are provided with handles 30 that are disposed in the plane extending through the center of gravity of the wagon and at right angles to the longitudinal axis of the wagon whereby, when the wagon is lifted, it will invariably be lifted by the handles and, consequently, will be lifted so that it can be handled in carrying the wagon as when a boy wishes to run and jump on the wagon to get momentum for coasting. Locating the handles in this position prevents the tipping over of the wagon or falling over the wagon and makes it exceedingly safe.

The wagon has a handle or tongue 33. The tongue is made in the form of a Y, it being provided with the arms 34 that may be formed of rod iron. The ends of the rods are inturned as at 35 and split pins 36 are elastically secured in openings 37 formed in the ends of the steering bar 13. The split pins 36 are provided at their ends with the knobs 38 whereby the ends may be easily inserted and secured in the openings 37, or readily removed therefrom to connect and disconnect the handle. The upper end of each split pin is provided with an oblong opening 39 that is substantially oval in its outline, it being provided with a smaller or slightly pointed end 40 which is located on the forward side of the center of the opening 39, so that when the tongue 33 is drawn, the inturned ends 35 of the rods 34 operate to spread the ends of the pins 36 and cause them to spread and to more tightly grip the end of the steering bar 13 within the opening 37.

I claim:

1. In a toy wagon, a pair of trucks, a plurality of elastic strips supported on the trucks and forming the wagon top, the rear truck secured to the rear end of the top, means for pivotally connecting the forward truck to the forward end of the top, a cross bar connected to the forward truck for moving the forward truck for guiding the wagon, a tongue having a Y, the inner ends of the arms of the Y turned inwardly, and a pair of removable elastic split pins for receiving the inturned ends and insertible in the cross bar.

2. In a toy wagon, a pair of trucks, a plurality of elastic strips supported on the trucks and forming the wagon top, the rear truck secured to the rear end of the top, means for pivotally connecting the forward truck to the forward end of the top, a cross bar connected to the forward truck for moving the forward truck for guiding the wagon, a tongue having a Y, the inner ends of the arms of the Y turned inwardly, a pair of split pins for receiving the inturned ends and insertible in the cross bar, each pin having an oblong eye substantially oval in shape for receiving the inturned end of an arm of the tongue and located on the forward side of the center of the eye for causing the split pin to expand and grip the cross bar when the tongue is drawn.

In witness whereof I have hereunto signed my name to this specification.

LAURENCE D. ELLIS.